(12) United States Patent
Nishio et al.

(10) Patent No.: US 6,456,920 B1
(45) Date of Patent: Sep. 24, 2002

(54) APPARATUS FOR ESTIMATING A VEHICLE SIDE SLIP ANGLE

(75) Inventors: Akitaka Nishio, Okazaki; Kenji Tozu, Yokkaichi, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 1 day.

(21) Appl. No.: 09/722,504

(22) Filed: Nov. 28, 2000

(30) Foreign Application Priority Data

Nov. 29, 1999 (JP) .......................... 11-337603

(51) Int. Cl.[7] ............................................. G06F 19/00
(52) U.S. Cl. ............................. 701/70; 701/1; 303/140
(58) Field of Search ................................ 701/1, 41, 70, 701/72, 74, 80; 180/197; 303/140, 146, 150

(56) References Cited

U.S. PATENT DOCUMENTS

| | | | |
|---|---|---|---|
| 4,872,116 A | * 10/1989 | Ito et al. | 701/41 |
| 5,710,705 A | * 1/1998 | Eckert | 180/197 |
| 5,711,023 A | * 1/1998 | Eckert et al. | 701/70 |
| 5,711,024 A | * 1/1998 | Wanke | 701/72 |
| 5,774,821 A | * 6/1998 | Eckert | 701/72 |
| 6,125,319 A | * 9/2000 | Hac et al. | 701/80 |
| 6,161,905 A | * 12/2000 | Hac et al. | 303/146 |

FOREIGN PATENT DOCUMENTS

| | | |
|---|---|---|
| JP | 9-311042 | 12/1887 |
| JP | 8-40232 | 2/1996 |
| JP | 9-301147 | 11/1997 |

* cited by examiner

Primary Examiner—Gary Chin
(74) Attorney, Agent, or Firm—Burns, Doane, Swecker & Mathis, LLP

(57) ABSTRACT

The present invention is directed to an apparatus for estimating a vehicle side slip angle, which includes a monitor for monitoring quantity of motion state of a vehicle including such signals as a vehicle speed, a vehicle lateral acceleration, a yaw rate and a steering angle, and includes a motion model memory for storing a vehicle motion model. A first estimation device estimates a vehicle side slip angle by calculating a vehicle side slip angular velocity on the basis of the vehicle speed, vehicle lateral acceleration and yaw rate, and integrating the vehicle side slip angular velocity in a predetermined calculating cycle. Also, a second estimation device estimates the vehicle side slip angle on the basis of the quantity of motion state monitored by the monitor, and the vehicle motion model stored in the motion model memory. A tire load determination device determines a lateral load to each tire of the vehicle on the basis of the result monitored by the monitor. And, a changing device changes between the estimation of the vehicle side slip angle made by the first estimation device and the estimation of the vehicle side slip angle made by the second estimation device, in accordance with the result of determination of the tire load determination device.

11 Claims, 8 Drawing Sheets

APPARATUS FOR ESTIMATING A VEHICLE SIDE SLIP ANGLE

This application claims priority under 35 U.S.C. Sec. 119 to No.11-337603 filed in Japan on Nov. 29, 1999, the entire content of which is herein incorporated by reference.

BACKGROUND OF THE INVENTION

1. Field of the Invention

The present invention relates to an apparatus for estimating a vehicle side slip angle, and more particularly to the apparatus for estimating the vehicle side slip angle by properly selecting one of the vehicle side slip angle estimated by integration and the vehicle side slip angle estimated on the basis of a vehicle motion model.

2. Description of the Related Arts

As a system for controlling a vehicle motion characteristic, especially a turning characteristic of the vehicle, an apparatus for controlling a difference between the braking force applied to right and left wheels to directly control a turning moment has been noted, and it is now on the market. For example, Japanese Patent Laid-open Publication No.9-301147 discloses a motion control apparatus which estimates an amount indicative of a motion state of a vehicle when the vehicle turns, and controls a hydraulic braking pressure control apparatus so as to correct a yaw moment of the vehicle to make the vehicle in motion to be stable, when the amount indicative of the motion state of the vehicle exceeded a threshold level for starting the control. In that publication, in order to change a range of the amount of the motion state of the vehicle for starting the control in accordance with a coefficient of friction, is proposed the motion control apparatus, wherein the lower the coefficient of friction is, the smaller the threshold level for starting the control is set.

In the vehicle motion control system as described above, various detectors for detecting signals indicative of the motion state of the vehicle have been provided. For example, Japanese Patent Laid-open Publication No.9-311042 proposes a detector for detecting a vehicle side slip angle through steering inputs and quantity of monitored motion state (e.g., yaw rate or lateral acceleration), wherein in order to deal flexibly with a variable parameter of a vehicle and estimate a side slip angle of a vehicle body with good accuracy, the vehicle side slip angle is estimated on the basis of an equation of motion indicative of the vehicle motion. Accordingly, it is described in the Publication that it is possible to deal flexibly with the nonlinearlity of a tire and with a change in the characteristic of the vehicle due to the vehicle speed, and enhance the estimated accuracy by correcting the estimated value of the vehicle side slip angle by means of a sensor signal.

It is disclosed in the Publication No.9-301147 that a vehicle side slip angular velocity $D\beta$ ($=Gy/Vso-\gamma$) is calculated on the basis of a vehicle lateral acceleration $Gy$, a vehicle speed $Vso$ and a yaw rate $\gamma$, and the vehicle side slip angular velocity $D\beta$ is integrated to obtain a vehicle side slip angle $\beta$ ($=\int D \beta dt$). Also, it is disclosed in the Publication No. 8-40232 that a vehicle lateral acceleration $Gy$, vehicle speed $V$ and yaw rate $\gamma$ are detected to obtain a deviation ($Gy-V\cdot\gamma$), which is integrated by a predetermined integral time to obtain a vehicle side slip velocity $Vy$. Thus, proposed is a vehicle turning motion control apparatus which estimates a vehicle turning motion at least on the basis of the vehicle side slip velocity, and controls the vehicle turning motion on the basis of the estimated turning motion.

In the case where the vehicle side slip angle is estimated on the basis of the vehicle motion model, as described in the aforementioned Publication No.9-311042, it is possible to do with the nonlinearlity of the tire, or do with a change in the characteristic of the tire due to a road surface condition, for example. It is, however, limited to a single kind of tire, and it is difficult to do with them in the case where various kinds of tires are changed to be used, or where air pressure of the tire is changed to cause an extremely large difference, and the like. In these cases, it is preferable to estimate the vehicle side slip angle by integration. According to this estimation, however, there will be caused such problems that an error is accumulated as described in the Publication No.8-40232, and a robust characteristic of the vehicle on a slope or the like is still affected. The vehicle side slip velocity $Vy$ used as a reference value for determining the vehicle turning motion in the Publication No.8-40232 corresponds to a value obtained by multiplying the vehicle side slip angular velocity $D\beta$ ($=Gy/Vso-\gamma$) disclosed in the Publication No.9-301147, with the vehicle speed $V$, so that it corresponds to the vehicle side slip angle.

Although the apparatus may be adapted to select properly one of the vehicle side slip angle estimated by integration and the vehicle side slip angle estimated on the basis of the vehicle motion model, as described above, so as to estimate the vehicle side slip angle, other problems will be caused. For instance, if changing the estimation is not executed properly, the vehicle motion control will be complicated to cause a delay in processing speed, so that it will be difficult to achieve a smooth motion control by using the vehicle side slip angle.

SUMMARY OF THE INVENTION

Accordingly, it is an object of the present invention to provide an apparatus for estimating a vehicle side slip angle by properly selecting one of the vehicle side slip angle estimated by integration and the vehicle side slip angle estimated on the basis of a vehicle motion model, through rapid and easy change of the estimation of the vehicle side slip angle.

In accomplish the above and other objects, the apparatus for estimating a vehicle side slip angle is arranged to include a monitor for monitoring quantity of motion state of a vehicle including such signals as a vehicle speed, a vehicle lateral acceleration, a yaw rate and a steering angle, and includes a motion model memory for storing therein a vehicle motion model. A first estimation device is provided for estimating a vehicle side slip angle by calculating a vehicle side slip angular velocity on the basis of the vehicle speed, vehicle lateral acceleration and yaw rate monitored by the monitor, and integrating the vehicle side slip angular velocity in a predetermined calculating cycle. Also, a second estimation device is provided for estimating the vehicle side slip angle on the basis of the quantity of motion state monitored by the monitor, and the vehicle motion model stored in the motion model memory. A tire load determination device is provided for determining a lateral load to each tire of the vehicle on the basis of the result monitored by the monitor. And, a changing device is provided for changing between the estimation of the vehicle side slip angle made by the first estimation device and the estimation of the vehicle side slip angle made by the second estimation device, in accordance with the result of determination of the tire load determination device.

Preferably, the tire load determination device is adapted to determine the lateral load to each tire of the vehicle, on the basis of a variation of at least one of the vehicle lateral acceleration and the yaw rate monitored by the monitor.

In the apparatus, the monitor may include a vehicle speed detector for detecting the vehicle speed, a lateral acceleration detector for detecting the vehicle lateral acceleration, a yaw rate detector for detecting the yaw rate, a steering angle detector for detecting the steering angle. Then, the first estimation device may be adapted to calculate the vehicle side slip angular velocity on the basis of the vehicle speed, the vehicle lateral acceleration and the yaw rate detected by the detectors respectively, and estimate the vehicle side slip angle by integrating the vehicle side slip angular velocity, and the second estimation device may be adapted to estimate the vehicle side slip angle on the basis of the vehicle speed, the vehicle lateral acceleration, the yaw rate and the steering angle detected by the detectors respectively, and the vehicle motion model stored in the motion model memory.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENT

Figure 1:
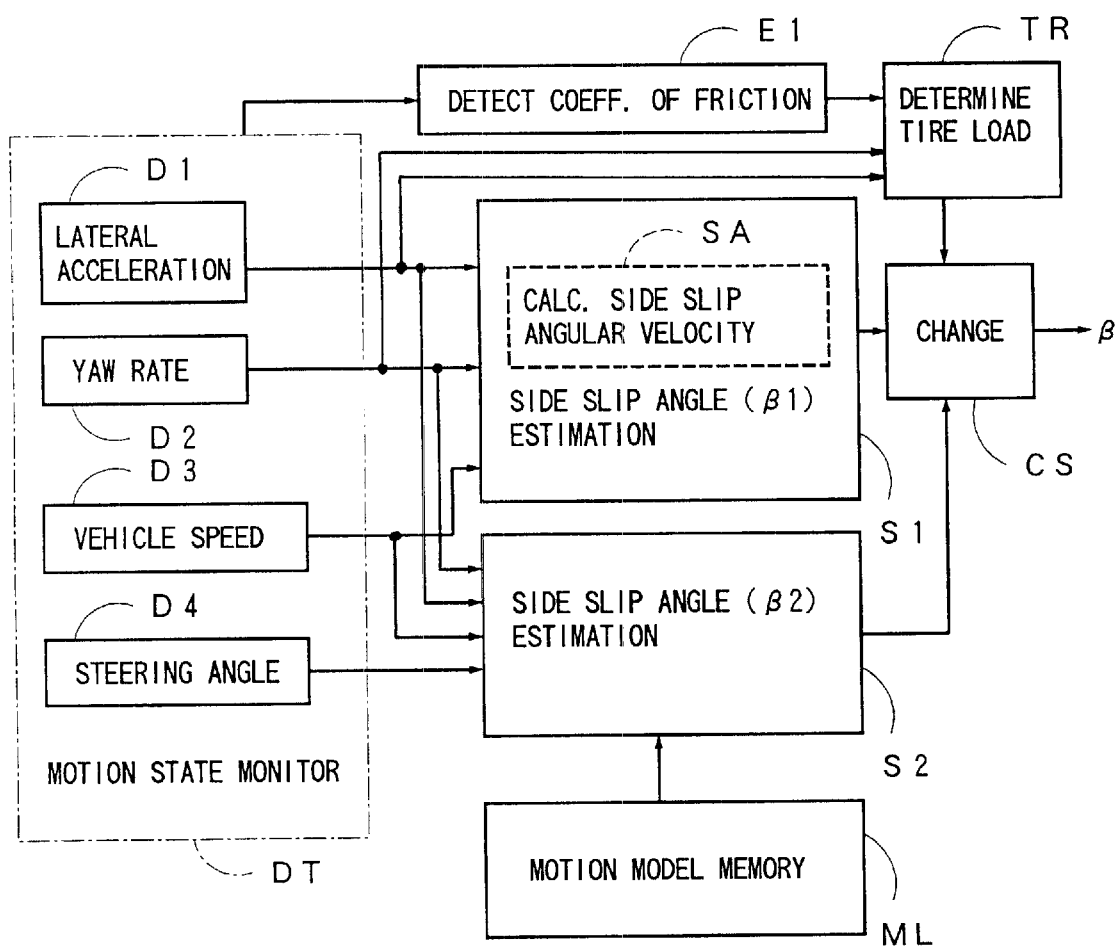
FIG. 1 is a block diagram illustrating an embodiment of an apparatus for estimating a vehicle side slip angle according to the present invention.

Referring to FIG. 1, there is schematically illustrated an apparatus for estimating a vehicle side slip angle according to an embodiment of the present invention. The apparatus is provided with a monitor DT for monitoring quantity of motion state of a vehicle including such signals as a vehicle speed, a vehicle lateral acceleration, a yaw rate and a steering angle. The monitor DT includes a detector D1 for detecting the vehicle lateral acceleration, a detector D2 for detecting the yaw rate of the vehicle, a detector D3 for detecting the vehicle speed and a detector D4 for detecting the steering angle. And, a motion model memory ML is provided for storing therein a vehicle motion model. Furthermore, a side slip angular velocity calculation device SA is provided for calculating a vehicle side slip angular velocity on the basis of the vehicle speed, vehicle lateral acceleration and yaw rate. Then, a first vehicle side slip angle estimation device S1 (hereinafter, referred to as first estimation device S1) is provided for estimating a vehicle side slip angle by integrating the vehicle side slip angular velocity in a predetermined calculating cycle. And, a second vehicle side slip angle estimation device S2 (referred to as second estimation device S2) is provided for estimating the vehicle side slip angle on the basis of the vehicle speed, vehicle lateral acceleration, yaw rate and steering angle, and also the vehicle motion model. A tire load determination device TR is provided for determining a lateral load to each tire of the vehicle on the basis of the signals monitored by the monitor DT, for example on the basis of a variation of at least one of the vehicle lateral acceleration and the yaw rate. In accordance with the result of determination of the tire load determination device TR, a changing device CS is provided for changing between the estimation of the vehicle side slip angle made by the first estimation device S1 and the estimation of the vehicle side slip angle made by the second estimation device S2. In this connection, for example, it may be so constituted that the estimation of the vehicle side slip angle is made by the first estimation device S1, in general, and in the case where the lateral load to the tire is relatively small, the estimation of the vehicle side slip angle made by the first estimation device S1 is changed to the estimation of the vehicle side slip angle made by the second estimation device S2.

The tire load determination device TR is adapted to compare an absolute value of the vehicle lateral acceleration monitored by the monitor DT with a predetermined value, and/or determine whether the vehicle lateral acceleration monitored by the monitor DT has passed a zero point. In the case where the absolute value of the vehicle lateral acceleration monitored by the monitor DT is smaller than the predetermined value, and/or the vehicle lateral acceleration monitored by the monitor DT has passed the zero point, the lateral load to the tire is small, so that the changing device CS is adapted to change the estimation of the vehicle side slip angle made by the first estimation device S1 to the estimation of the vehicle side slip angle made by the second estimation device S2. Or, the tire load determination device TR may be adapted to compare an absolute value of the yaw rate monitored by the monitor DT with a predetermined value, and/or determine whether the yaw rate monitored by the monitor DT has passed a zero point. In the case where the absolute value of the yaw rate monitored by the monitor DT is smaller than the as predetermined value, and/or the yaw rate monitored by the monitor DT has passed the zero point, the changing device CS may be adapted to change the estimation of the vehicle side slip angle made by the first estimation device S1 to the estimation of the vehicle side slip angle made by the second estimation device S2. Furthermore, a coefficient of friction estimation device E1 (simply referred to as device E1) may be provided for estimating a coefficient of friction against a road surface on which the vehicle is travelling, as shown in FIG. 1. On the basis of this estimated coefficient of friction, the tire load determination means TR may be adapted to set the predetermined value to be compared with the absolute value of the vehicle lateral acceleration, or the predetermined value to be compared with the absolute value of the yaw rate, as will be described later in detail.

Figure 2:
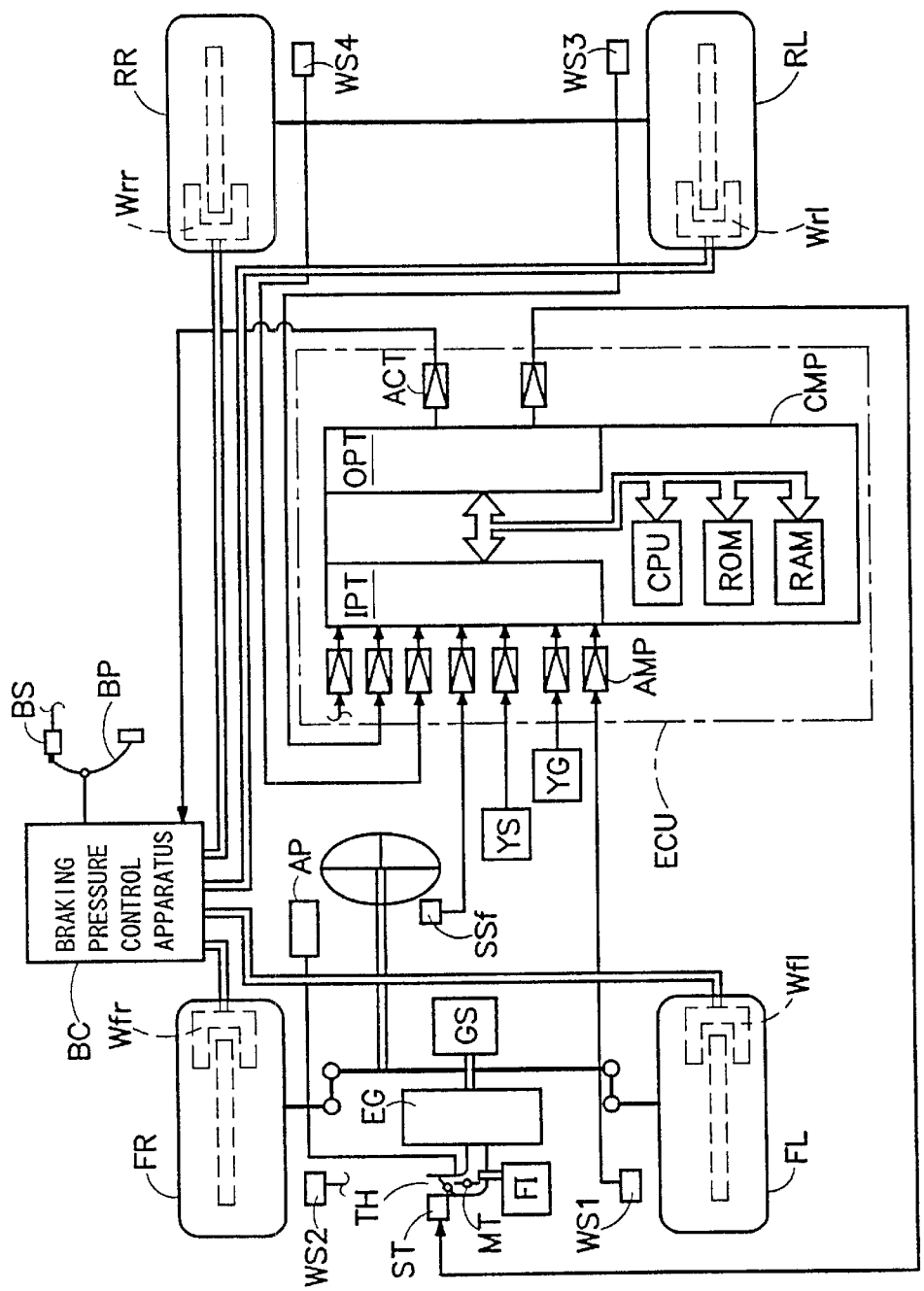
FIG. 2 is a schematic block diagram of a vehicle motion control system having an apparatus for estimating a vehicle side slip angle according to an embodiment of the present invention.

FIG. 2 illustrates a vehicle having the vehicle motion control system provided with the apparatus for estimating the vehicle slip angle as described above. The vehicle has an engine EG provided with a fuel injection apparatus FI and a throttle control apparatus TH which is adapted to control a main throttle opening of a main throttle valve MT in response to operation of an accelerator pedal AP. The throttle control apparatus TH has a sub-throttle valve ST which is actuated in response to an output signal of an electronic controller ECU to control a sub-throttle opening. Also, the fuel injection apparatus FI is actuated in response to an output signal of an electronic controller ECU to control the fuel injected into the engine EG. According to the present embodiment, the engine EG is operatively connected with the front wheels FL, FR through a transmission GS to provide a front-drive system according to the present embodiment, but it is not limited to the front-drive system. The wheel FL designates the wheel at the front left side as viewed from the position of a driver's seat, the wheel FR designates the wheel at the front right side, the wheel RL designates the wheel at the rear left side, and the wheel RR designates the wheel at the rear right side. With respect to a braking system according to the present embodiment, wheel brake cylinders Wfl, Wfr, Wrl, Wrr are operatively mounted on the wheels FL, FR, RL, RR of the vehicle, respectively, and which is fluidly connected to a hydraulic braking pressure control apparatus BC. According to the present embodiment, a so-called diagonal circuit system has been employed.

As shown in FIG. 2, at the wheels FL, FR, RL and RR, there are provided wheel speed sensors WS1 to WS4 respectively, which are connected to the electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle θf of the front wheels FL, FR, a lateral acceleration sensor YG for detecting a vehicle lateral acceleration, and a yaw rate sensor YS for detecting a yaw rate, i.e., yaw velocity of the vehicle. These are electrically connected to the electronic controller ECU. Accordingly, the lateral acceleration sensor YG, yaw rate sensor YS and front steering angle sensor SSf correspond to the detectors D1, D2 and D4 as shown in FIG. 1, respectively.

Referring to FIG. 2, the electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic braking pressure control apparatus BC via the respective driving circuits ACT. In the microcomputer CMP, the read-only memory ROM memorizes a program corresponding to flowcharts as shown in FIGS. 3 to 6, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

Figure 3:
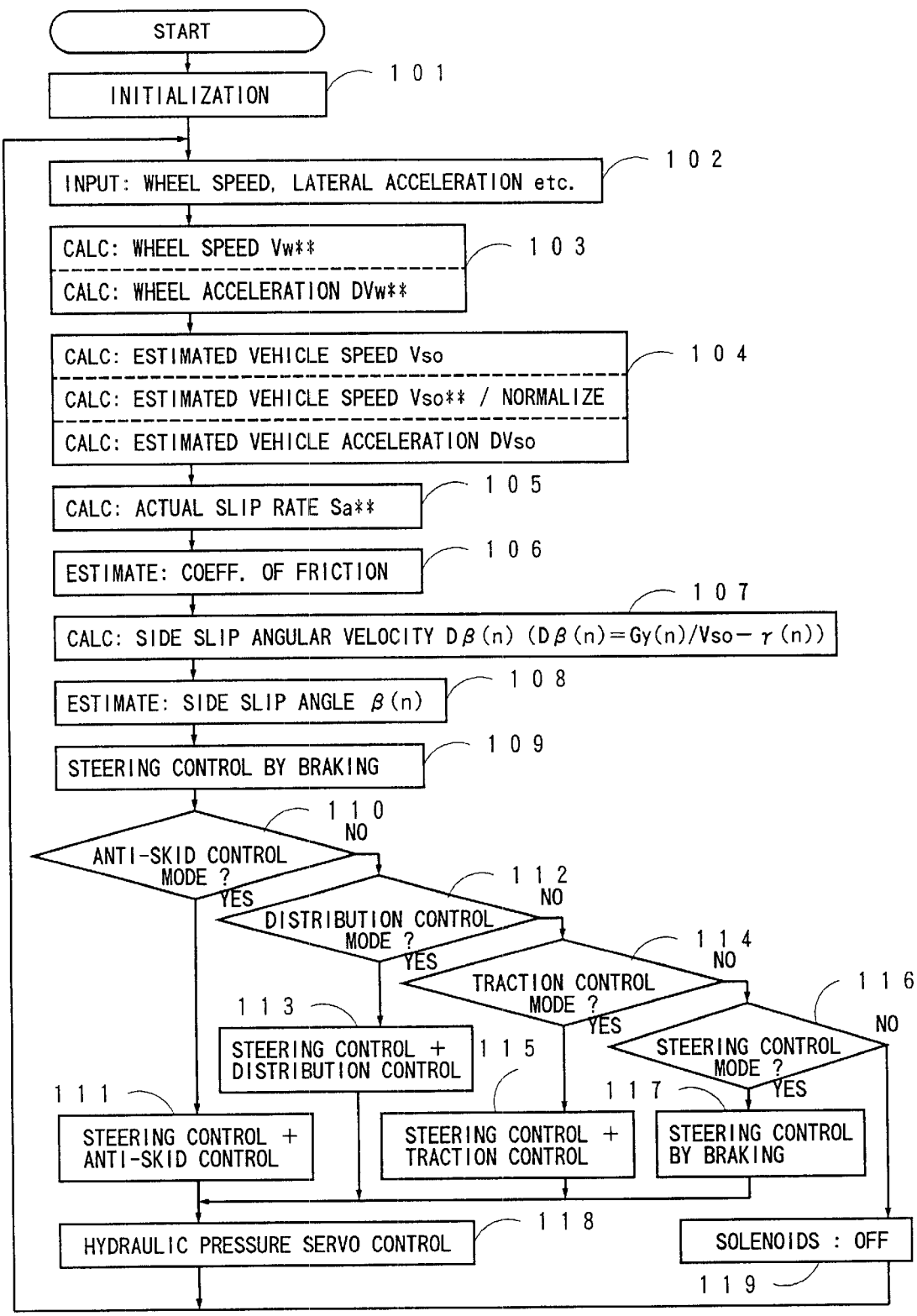
FIG. 3 is a flowchart showing a main routine of a vehicle motion control according to an embodiment of the present invention.

According to the present embodiment as constituted above, a program routine for the vehicle motion control including the steering control by braking, anti-skid control and so on is executed by the electronic controller ECU, as will be described hereinafter with reference to FIGS. 3 to 6. The program routine starts when an ignition switch (not shown) is turned on. At the outset, the program for the motion control as shown in FIG. 3 provides for initialization of the system at Step 101 to clear various data. At Step 102, the signals detected by the wheel speed sensors WS1 to WS4 are read by the electronic controller ECU, and also read are the signal (steering angle θf) detected by the front steering angle sensor SSf, the signal (actual yaw rate $\gamma(n)$) detected by the yaw rate sensor YS, and the signal (actual lateral acceleration $Gy(n)$) detected by the lateral acceleration sensor YG.

Then, the program proceeds to Step 103 where the wheel speed Vw ( represents one of the wheels FL, FR, RL, RR) of each wheel is calculated, and differentiated to provide the wheel acceleration DVw. At Step 104, the maximum of the wheel speeds Vw for four wheels is calculated to provide an estimated vehicle speed Vso on the center of gravity of the vehicle (Vso-MAX[Vw]), and an estimated vehicle speed Vso is calculated for each wheel, respectively, on the basis of the wheel speed Vw. The estimated vehicle speed Vso may be normalized to reduce an error caused by a difference between the wheels located on the inside and outside of the curve while cornering. Furthermore, the estimated vehicle speed Vso is differentiated to provide an estimated vehicle acceleration DVso (including an estimated vehicle deceleration of opposite sign). At Step 105, also calculated is an actual slip rate Sa on the basis of the wheel speed Vw for each wheel and the estimated vehicle speed Vso** (or, the estimated and normalized vehicle speed) which are calculated at Steps 103 and 104, respectively, in accordance with the following equation:

$$Sa^{}=(Vso^{}-Vw^{})/Vso^{}$$

Then, at Step 106, on the basis of the vehicle acceleration DVso and the actual lateral acceleration $Gy(n)$ detected by the lateral acceleration sensor YG, the coefficient of friction $\mu$ against a road surface can be calculated in accordance with the following equation:

$$\mu \approx (DVso^2 + Gy(n)^2)^{1/2}$$

In order to detect the coefficient of friction against the road surface, various methods may be employed other than the above method, such as a sensor for directly detecting the coefficient of friction against the road surface.

The program proceeds to Steps 107, 108, a vehicle side slip angular velocity $D\beta(n)$ and a vehicle side slip angle $\beta(n)$ are calculated. The side slip angle $\beta(n)$ is an angle which corresponds to a vehicle slip against the vehicle's path of travel, which can be estimated as follows. That is, at the outset, the side slip angular velocity $D\beta(n)$, which is a differentiated value $d\beta(n)/dt$ of the side slip angle $\beta(n)$, is calculated at Step 107 in accordance with the following equation:

$$D\beta(n)=Gy(n)/Vso-\gamma(n)$$

Then, the side slip angle $\beta(n)$ is estimated, as will be described later in detail, with reference to FIG. 4.

Then, the program proceeds to Step 109 where the mode for the steering control by braking is made to provide a desired slip rate for use in the steering control by braking, wherein the braking force applied to each wheel is controlled at Step 118 through the hydraulic pressure servo control which will be explained later. The steering control by braking is to be added to each control performed in all the control modes described later. Then, the program proceeds to Step 110, where it is determined whether the condition for initiating the anti-skid control is fulfilled or not. If it is determined that the condition is in the anti-skid control mode, the program proceeds to Step 111, where a control mode performing both the steering control by braking and the anti-skid control start.

If it is determined at Step 110 that the condition for initiating the anti-skid control has not been fulfilled, then the program proceeds to Step 112 where it is determined whether the condition for initiating the front and rear braking force distribution control is fulfilled or not. If it is affirmative at Step 112, the program further proceeds to Step 113 where a control mode for performing both the steering control by braking and the braking force distribution control is performed, otherwise it proceeds to Step 114, where it is determined whether the condition for initiating the traction control is fulfilled or not. If the condition for initiating the traction control is fulfilled, the program proceeds to Step 115 where a control mode for performing both the steering control by braking and the traction control is performed. Otherwise, the program proceeds to Step 116 where it is determined whether the condition for initiating the steering control by braking is fulfilled or not. If the condition for initiating the steering control by braking is fulfilled, the program proceeds to Step 117 where a control mode for performing only the steering control by braking is set. On the basis of the control modes as set in the above, the hydraulic pressure servo control is performed at Step 118, and then the program returns to Step 102. If it is determined at Step 116 that the condition for initiating the steering control by braking has not been fulfilled, the program proceeds to Step 119 where solenoids for all of the solenoid valves are turned off, and then the program returns to Step 102. In accordance with the control modes set at Steps 111, 113, 115 and 117, the sub-throttle opening angle for the throttle control apparatus TH may be adjusted in response to the motion state of the vehicle, so that the output of the engine EG could be reduced to limit the driving force produced thereby.

Figure 4:
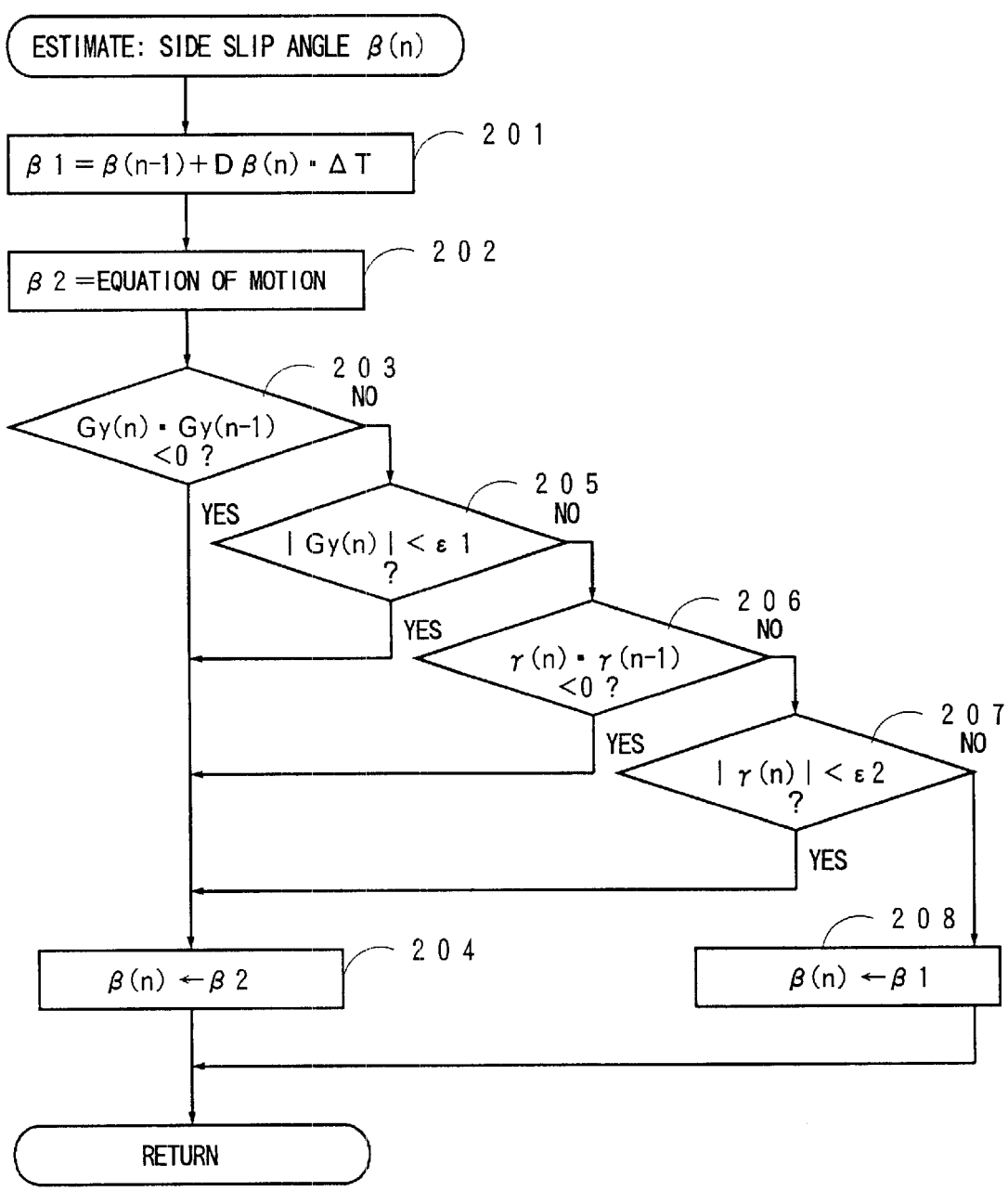
FIG. 4 is a flowchart showing a subroutine for estimating a vehicle side slip angle according to an embodiment of the present invention.

FIG. 4 shows a flowchart for the operation of the estimation of the side slip angle β(n) performed at Step 108 in FIG. 3, which is repeated by a predetermined calculation cycle (ΔT). At step 201, as for the integral value of the side slip angular velocity Dβ(n), which is a result calculated at Step 107 in FIG. 3, and the calculation cycle (ΔT) are multiplied to produce a product (Dβ(n)·ΔT), i.e., an approximate integral value of the side slip angular velocity Dβ(n), so that the approximate integral value, which is approximately equal to the integral value of the side slip angular velocity Dβ(n), i.e., ∫Dβ(n)dt, is calculated, and added to the side slip angle β(n−1) obtained in the previous cycle (n−1) to obtain a first side slip angle β1.

Then, the program proceeds to Step 202, where a second side slip angle β2 is calculated in accordance with the equation of vehicle motion, as follows:

$$m \cdot V(d\beta/dt + d\gamma \cdot dt) = -Cf\{\beta + (Lf \cdot d\gamma/dt)/V - \theta f\} - Cr\{\beta - (Lr \cdot d\gamma/dt)/V\};$$

and $$I \cdot d^2\gamma/dt^2 = -Lf \cdot Cf\{(\beta + (Lf \cdot d\gamma/dt)/V - \theta f\} + Lr \cdot Cr\{\beta - (Lr \cdot d\gamma/dt)/V\},$$

where "m" is a mass of the vehicle, "Cf" is a cornering force of a front wheel, "Cr" is a cornering force of a rear wheel, "Lf" is a distance between a front axle and the gravity center, "Lr" a distance between a rear axle and the gravity center, "θf" is the steering angle of the front wheel, and "I" is a yaw inertia moment.

The second side slip angle β2 is the same as the side slip angle which is obtained on the basis of the equation of motion as described in the aforementioned Publication No.9-311042 which is herein incorporated by reference, so that the detailed explanation will be omitted.

Then, the product of the lateral acceleration at the present cycle Gy(n) and the lateral acceleration Gy(n−1) at the previous cycle is obtained at Step 203, and the sign of the product is determined. In the case where the product is negative, i.e., the signs of the lateral acceleration Gy(n) at the present cycle and the lateral acceleration Gy(n−1) at the previous cycle are different, it means that the lateral acceleration Gy has passed the zero point. In this case, the load to the tire is small, so that it is preferable to use the second side slip angle β2 of small error. Therefore, the program proceeds to Step 204, where the second side slip angle β2 obtained on the basis of the equation of motion of the vehicle is set for the side slip angle β(n) at the present cycle. Namely, employed is the second side slip angle β2 in a portion indicated by a solid line in the middle of the lower part of FIG. 9.

On the contrary, in the case where the sign of the product of the lateral acceleration Gy(n) at the present cycle and the lateral acceleration Gy(n−1) at the previous cycle is determined to be positive at Step 203, i.e., the signs of the lateral acceleration Gy(n) at the present cycle and the lateral acceleration Gy(n−1) at the previous cycle are the same, the program further proceeds to Step 205, where the absolute value of the lateral acceleration Gy(n) is compared with a predetermined value ε1. If it is determined that the absolute value of the lateral acceleration Gy(n) is lower than the predetermined value ε1, it is estimated that the lateral acceleration Gy will approximate to zero, so that the second side slip angle β2 obtained on the basis of the equation of motion of the vehicle is set for the side slip angle β(n) at the present cycle at Step 204. Then, if it is determined that the absolute value of the lateral acceleration Gy(n) at the present cycle is equal to or greater than the predetermined value ε1, the program proceeds to Step 206. At step 206, the sign of the product of the yaw rate γ(n) at the present cycle and the yaw rate γ(n−1) at the previous cycle is calculated, and the sign of the product is determined. In the case where the product is negative, i.e., the signs of the yaw rate γ(n) at the present cycle and the yaw rate γ(n−1) at the previous cycle are different, it means that the yaw rate γ has passed the zero point, so that it is preferable to use the second side slip angle β2 of small error, since the load to the tire is small. Therefore, the program proceeds to Step 204, where the second side slip angle β2 obtained on the basis of the equation of motion of the vehicle is set for the side slip angle β(n) at the present cycle. In the case where the sign of the product of the yaw rate γ(n) at the present cycle and the yaw rate γ(n−1) at the previous cycle is determined to be positive at Step 206, i.e., the signs of the yaw rate γ(n) at the present cycle and the yaw rate γ(n−1) at the previous cycle are the same, the program further proceeds to Step 207, where the absolute value of the yaw rate γ(n) is compared with a predetermined value ε2.

Figure 9:
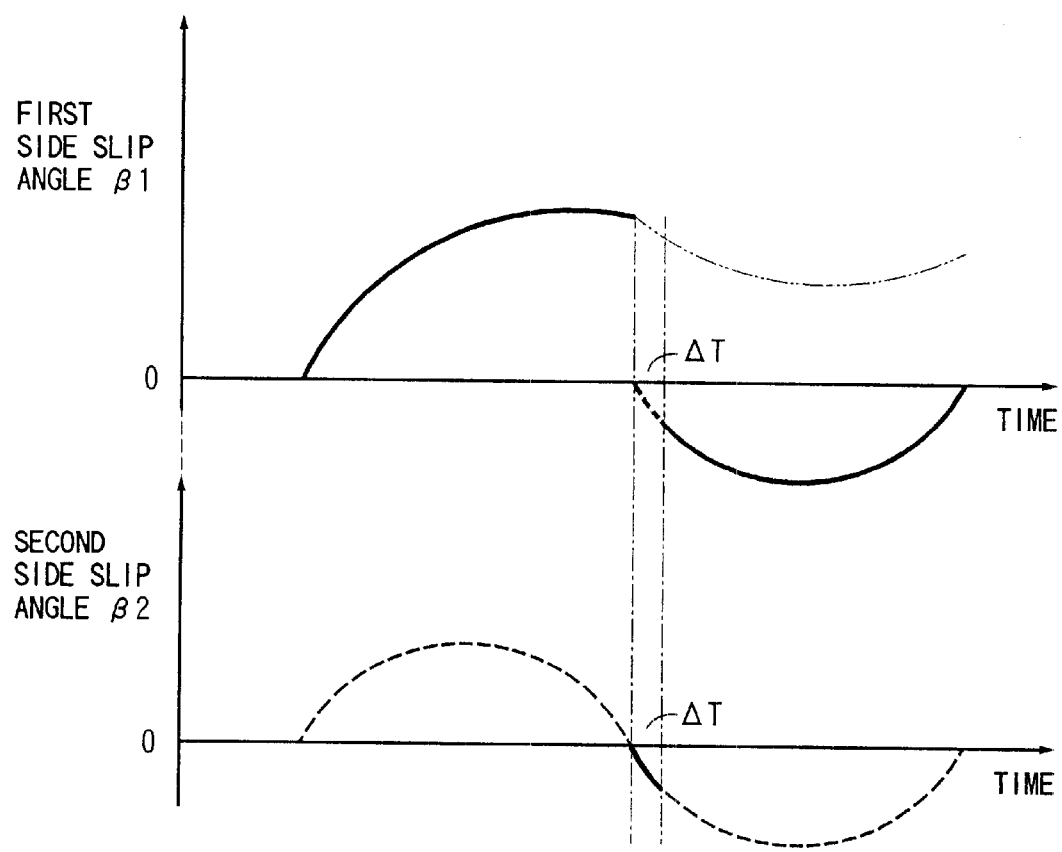
FIG. 9 is a time chart when first and second side slip angles are estimated according to an embodiment of the present invention.

If it is determined that the absolute value of the yaw rate γ(n) is lower than the predetermined value ε2, the second side slip angle β2 obtained on the basis of the equation of motion of the vehicle is set for the side slip angle β(n) at the present cycle at Step 204. Then, if it is determined that the absolute value of the yaw rate γ(n) at the present cycle is equal to or greater than the predetermined value ε2, the program proceeds to Step 208, where the first side slip angle β1 of the approximate integral value is set for the side slip angle β(n) at the present cycle. Namely, employed is the first side slip angle β1 in a portion indicated by a solid line in the right portion of the upper part of FIG. 9. In FIG. 9, a portion indicated by a two-dotted chain line is the value of the first side slip angle β1 which is provided in the case where the change is not made.

Figure 7:
FIG. 7 is a diagram showing a map for setting a predetermined value $\epsilon1$ in accordance with a coefficient of friction $\mu$ of a road according to an embodiment of the present invention.
Figure 8:
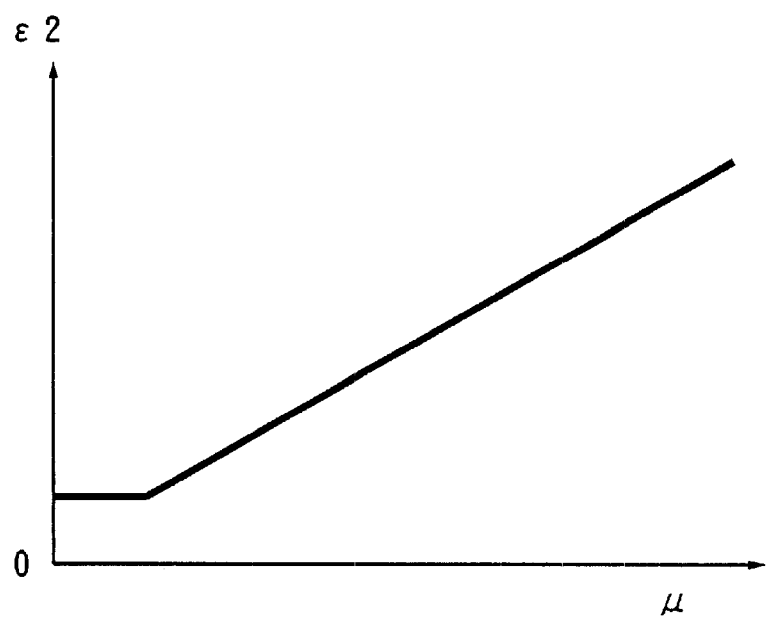
FIG. 8 is a diagram showing a map for setting a predetermined value $\epsilon2$ in accordance with a coefficient of friction $\mu$ of a road according to an embodiment of the present invention.

The predetermined values ε1 (lateral acceleration) and ε2 (yaw rate) are set in accordance with the coefficient of friction μ against the road surface as shown in FIGS. 7 and 8, respectively. That is, the larger the coefficient of friction μ estimated at Step 106 is, the larger the predetermined values ε1 and ε2 are set.

Figure 5:
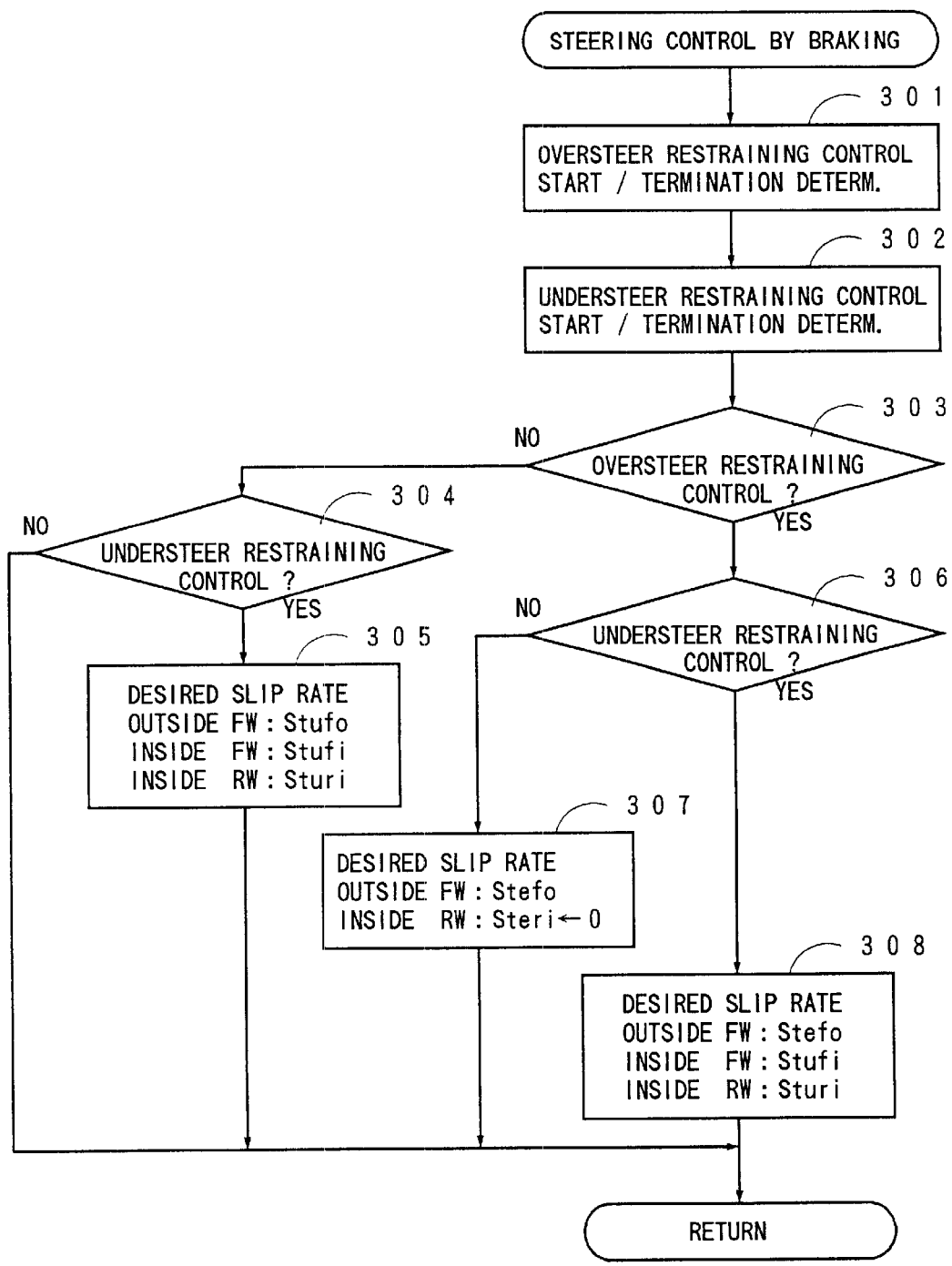
FIG. 5 is a flowchart showing a subroutine for setting a target slip rate for use in a steering control by braking according to an embodiment of the present invention.

FIG. 5 shows a flowchart for the operation of the steering control by braking performed at Step 109 in FIG. 3, which includes the oversteer restraining control and the understeer restraining control. Through this flowchart, therefore, the desired slip rates are set in accordance with the oversteer restraining control and/or the understeer restraining control. At the outset, it is determined at Step 301 whether the oversteer restraining control is to be started or terminated, and also determined at Step 302 whether the understeer restraining control is to be started or terminated. More specifically, the determination is made at Step 301 on the basis of the determination whether it is within a control zone provided on a first map (not shown). For example, if the side slip angle β(n) and the side slip angular velocity Dβ(n) which are calculated when determining the start or termination, are fallen within the control zone, the oversteer restraining control will be started. However, if the side slip angle β(n) and the side slip angular velocity Dβ(n) come to be out of the control zone, the oversteer restraining control will be controlled thereby to be terminated. On the other hand, the determination of the start and termination of the understeer restraining control is made at Step 302 on the basis of the determination whether it is within a control zone provided on a second map (not shown). For example, in accordance with the variation of the actual lateral acceleration Gy(n) against a desired lateral acceleration Gyt, if they become out of the desired condition, and fallen within the control zone, then the understeer restraining control will be started. If they come to be out of the zone, the understeer restraining control will be terminated.

Then, the program proceeds to Step 303, where it is determined whether the oversteer restraining control is to be performed or not. If the oversteer restraining control is not to be performed, the program further proceeds to Step 304 where it is determined whether the understeer restraining control is to be performed or not. In the case where the understeer restraining control is not to be performed, the program returns to the main routine. In the case where it is determined at Step 304 that the understeer restraining control is to be performed, the program proceeds to Step 305 where the desired slip rate of each wheel is set to a desired slip rate which is provided for use in the understeer restraining control. If it is determined at Step 303 that the oversteer restraining control is to be performed, the program proceeds to Step 306 where it is determined whether the understeer restraining control is to be performed or not. In the case where the understeer restraining control is not to be performed, the program proceeds to Step 307 where the desired slip rate of each wheel is set to a desired slip rate which is provided for use in the oversteer restraining control. In the case where it is determined at Step 306 that the understeer restraining control is to be performed, the program proceeds to Step 308 where the desired slip rate of each wheel is set to a desired slip rate which is provided for use in both of the oversteer restraining control and the understeer restraining control.

At Step 305, the desired slip rate of a front wheel located on the outside of the curve of the vehicle's path is set as "Stufo", the desired slip rate of a front wheel located on the inside of the curve is set as "Stufi", and the desired slip rate of a rear wheel located on the inside of the curve is set as "Sturi". As for the slip rate (S), "t" indicates a desired value, which is comparable with a measured actual value indicated by "a". Then, "u" indicates the understeer restraining control, "f" indicates the front wheel, "r" indicates the rear wheel, "o" indicates the outside of the curve, and "i" indicates the inside of the curve, respectively.

At Step 307, the desired slip rate of the front wheel located on the outside of the curve is set as "Stefo", and the desired slip rate of the rear wheel located on the inside of the curve is set as "Steri", wherein "e" indicates the oversteer restraining control. Whereas, at Step 308, the desired slip rate of the front wheel located on the outside of the curve is set as "Stefo", the desired slip rate of the front wheel located on the inside of the curve is set as "Stufi", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the wheels located on the inside of the curve are set to be the same rates as the desired slip rates for use in the understeer restraining control. In any cases, however, a rear wheel located on the outside of the curve, i.e., a non-driven wheel of the front drive vehicle is not to be controlled, because this wheel is employed as a reference wheel for use in calculation of the estimated vehicle speed.

With respect to the desired slip rate for use in the oversteer restraining control set at Step 307, the side slip angle β(n) and the side slip angular velocity Dβ(n) are employed. With respect to the desired slip rate for use in the understeer restraining control, a difference between the desired lateral acceleration Gyt and the actual acceleration Gy(n) is employed. The desired slip rates Stefo for use in the oversteer restraining control is calculated in accordance with the following equation:

$$\text{Stefo} = K1 \cdot \beta(n) + K2 \cdot D\beta(n)$$

where K1, K2 are constants which are set so as to provide the desired slip rate Stefo, and which are used for increasing the braking pressure (i.e., increasing the braking force). However, the desired slip rate Steri of the rear wheel located on the inside of the curve is set to be zero.

On the contrary, the desired slip rates Stufo, Sturi for use in the understeer restraining control are calculated in accordance with the following equations, respectively:

$$\text{Stufo} = K3 \cdot \Delta Gy$$

$$\text{Sturi} = K4 \cdot \Delta Gy$$

$$\text{Stufi} = K5 \cdot \Delta Gy$$

where K3 is a constant for providing the desired slip rate Stufo, which is used for increasing the braking pressure (or, alternatively decreasing the braking pressure), while K4, K5 are constants for providing the desired slip rate, which are used for increasing the braking pressure.

Figure 6:
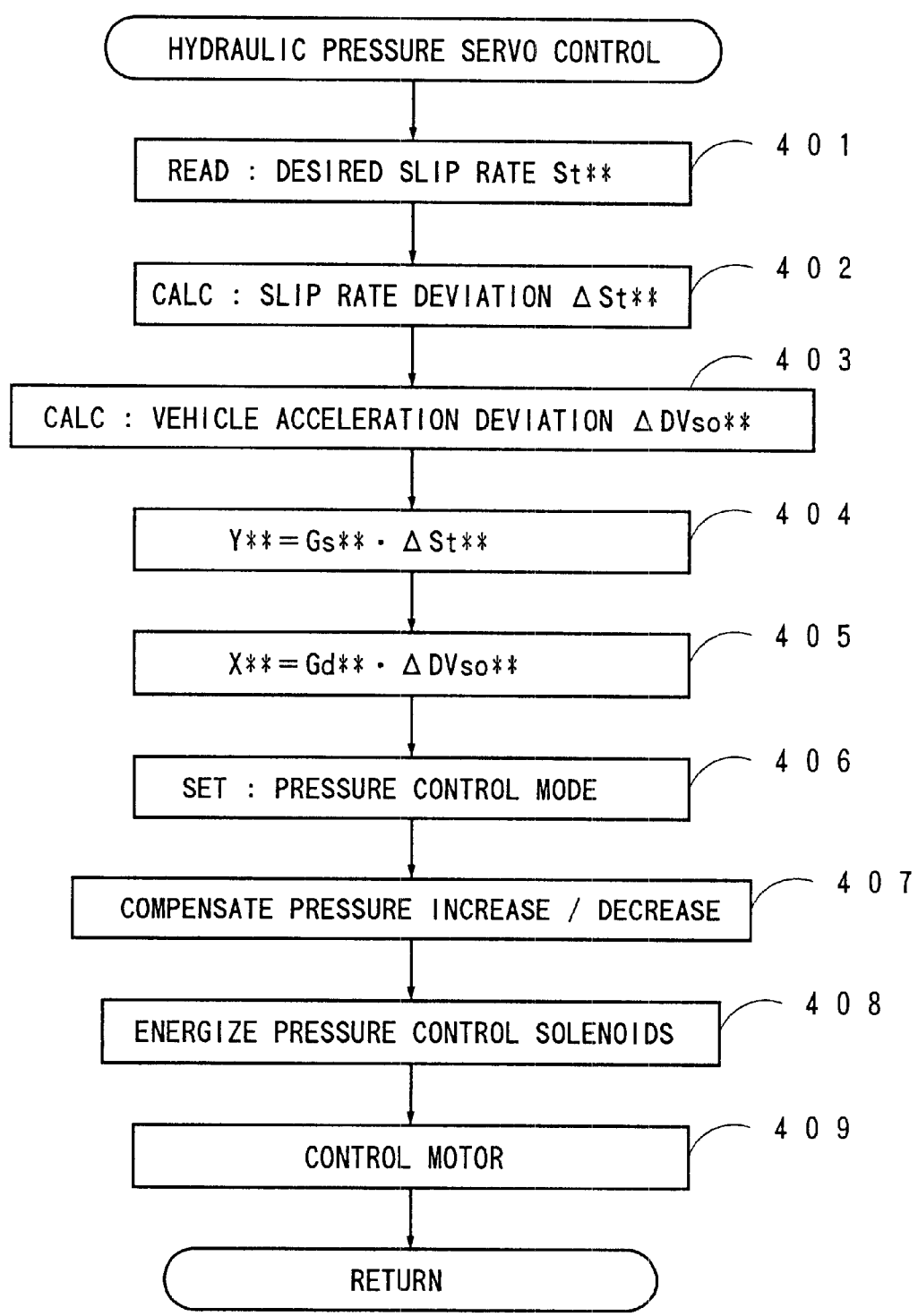
FIG. 6 is a flowchart showing a hydraulic pressure servo control according to an embodiment of the present invention.

FIG. 6 shows the hydraulic pressure servo control which is executed at Step 118 in FIG. 3, and wherein the wheel cylinder pressure for each wheel is controlled through the slip rate servo control. At Step 401, the desired slip rates St , which are set at Step 305, 307 or 308, are read to provide the desired slip rate for each wheel of the vehicle. Then, the program proceeds to Step 402 where a slip rate deviation ΔSt is calculated for each wheel, and further proceeds to Step 403 where a vehicle acceleration deviation ΔDVso is calculated. At Step 402, the difference between the desired slip rate St and the actual slip rate Sa is calculated to provide the slip rate deviation ΔSt (i.e., ΔSt=St−Sa). And, at Step 403, the difference between the estimated vehicle acceleration DVso on the center of gravity of the vehicle and the vehicle acceleration DVw of a selected wheel is calculated to provide the vehicle acceleration deviation ΔDVso. The actual slip rate Sa and the vehicle acceleration deviation ΔDVso** may be calculated in accordance with a specific manner which is determined in dependence upon the control modes such as the anti-skid control mode, traction control mode or the like, the explanation of which will be omitted.

Then, the program proceeds to Step 404 where a parameter Y** for providing a hydraulic pressure control in each control mode is calculated in accordance with the following equation:

$$Y^{} = Gs^{} \cdot \Delta St^{**}$$

where "Gs" is a gain, which is provided in response to the side slip angle β(n). The program further proceeds to Step 405 where another parameter X is calculated in accordance with the following equation:

$$X^{} = Gd^{} \cdot \Delta DVso^{**}$$

where "Gd" is a gain which is a constant value. On the basis of the parameters X and Y, a pressure control mode for each wheel is provided at Step 406, in accordance with a control map (not shown). The control map has a rapid pressure decrease zone, a pulse pressure decrease zone, a pressure hold zone, a pulse pressure increase zone, and a rapid pressure increase zone which are provided in advance, so that any one of the zones is selected in accordance with the parameters X and Y** at Step 406. In the case where no control mode is performed, no pressure control mode is provided (i.e., solenoids are off).

At Step 407, is performed a pressure increase and decrease compensating control, which is required for smoothing the first transition and last transition of the hydraulic pressure, when the presently selected zone is changed from the previously selected zone at Step 406, e.g., from the pressure increase zone to the pressure decrease zone, or vice versa. When the zone is changed from the rapid pressure decrease zone to the pulse pressure increase zone, for instance, the rapid pressure increase control is performed for a period which is determined on the basis of a period during which the rapid pressure decrease mode, which was provided immediately before the rapid pressure increase control, lasted. Then, the program proceeds to Step 408, where the solenoid of each valve in the hydraulic pressure control apparatus BC is energized or de-energized in accordance with the mode determined by the selected pressure control zone or the pressure increase and decrease compensating control thereby to control the braking force applied to each wheel. Then, the program proceeds to Step 409 where a motor for driving a pressure pump is actuated. Although the slip rate is used for the control in the present embodiment, any value corresponding to the braking force applied to each wheel, such as the braking pressure in each wheel brake cylinder, may be employed as the desired value.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. An apparatus for estimating a vehicle side slip angle, comprising:

monitor means disposed in a vehicle for monitoring a quantity of motion state of said vehicle including signals of a vehicle speed, a vehicle lateral acceleration, a yaw rate and a steering angle;

motion model memory means for storing a vehicle motion model in a memory;

first estimation means for estimating a vehicle side slip angle by calculating a vehicle side slip angular velocity on the basis of the vehicle speed, the vehicle lateral acceleration and the yaw rate monitored by said monitor means, and integrating the vehicle side slip angular velocity in a predetermined calculating cycle;

second estimation means for estimating the vehicle side slip angle on the basis of the quantity of motion state monitored by said monitor means, and the vehicle motion model stored in the memory by said motion model memory means;

tire load determination means for determining a lateral load to each tire of said vehicle on the basis of the result monitored by said monitor means; and changing means for switching between the estimation of the vehicle side slip angle made by said first estimation means and the estimation of the vehicle side slip angle made by said second estimation means, in accordance with the result of determination of said tire load determination means.

2. The apparatus for estimating the vehicle side slip angle of claim 1, wherein said tire load determination means determines the lateral load to each tire of said vehicle, on the basis of a variation of at least one of the vehicle lateral acceleration and the yaw rate monitored by said monitor means.

3. The apparatus for estimating the vehicle side slip angle of claim 2, wherein said tire load determination means compares an absolute value of the vehicle lateral acceleration monitored by said monitor means with a predetermined value, and determines whether the vehicle lateral acceleration monitored by said monitor means has passed a zero point, and wherein said changing means switches the estimation of the vehicle side slip angle made by said first estimation means to the estimation of the vehicle side slip angle made by said second estimation means, when the absolute value of the vehicle lateral acceleration monitored by said monitor means is smaller than the predetermined value, and the vehicle lateral acceleration monitored by said monitor means has passed the zero point.

4. The apparatus for estimating the vehicle side slip angle of claim 3, further comprising means for estimating a coefficient of friction against a road surface on which said vehicle is travelling, wherein said tire load determination means sets the predetermined value to be compared with the absolute value of the vehicle lateral acceleration, on the basis of the estimated coefficient of friction.

5. The apparatus for estimating the vehicle side slip angle of claim 2, wherein said tire load determination means compares an absolute value of the yaw rate monitored by said monitor means with a predetermined value, and determines whether the yaw rate monitored by said monitor means has passed a zero point, and wherein said changing means switches the estimation of the vehicle side slip angle made by said first estimation means to the estimation of the vehicle side slip angle made by said second estimation means, when the absolute value of the yaw rate monitored by said monitor means is smaller than the predetermined value, and the yaw rate monitored by said monitor means has passed the zero point.

6. The apparatus for estimating the vehicle side slip angle of claim 5, further comprising mean for estimating a coefficient of friction against a road surface on which said vehicle is travelling, wherein said tire load determination means sets the predetermined value to be compared with the absolute value of the yaw rate, on the basis of the estimated coefficient of friction.

7. The apparatus for estimating the vehicle side slip angle of claim 1, wherein said monitor means includes vehicle speed detection means for detecting the vehicle speed, lateral acceleration detection means for detecting the vehicle lateral acceleration, yaw rate detection means for detecting the yaw rate, steering angle detection means for detecting the steering angle, wherein said first estimation means calculates the vehicle side slip angular velocity on the basis of the vehicle speed detected by said vehicle speed detection means, the vehicle lateral acceleration detected by said lateral acceleration detection means and the yaw rate detected by said yaw rate detection means, and estimates the vehicle side slip angle by integrating the vehicle side slip angular velocity, and wherein said second estimation means estimates the vehicle side slip angle on the basis of the vehicle speed detected by said vehicle speed detection means, the vehicle lateral acceleration detected by said vehicle lateral acceleration detection means, the yaw rate detected by said yaw rate detection means, the steering angle detected by said steering angle detection means, and the vehicle motion model stored in the memory by said motion model memory means.

8. The apparatus for estimating the vehicle side slip angle of claim 2, wherein said tire load determination means compares an absolute value of the vehicle lateral acceleration monitored by said monitor means with a predetermined value, and wherein said changing means switches the estimation of the vehicle side slip angle made by said first estimation means to the estimation of the vehicle side slip angle made by said second estimation means when the absolute value of the vehicle lateral acceleration monitored by said monitor means is smaller than the predetermined value.

9. The apparatus for estimating the vehicle side slip angle of claim 2, wherein said tire load determination means determines whether the vehicle lateral acceleration monitored by said monitor means has passed a zero point, and wherein said changing means switches the estimation of the vehicle side slip angle made by said first estimation means to the estimation of the vehicle side slip angle made by said second estimation means when the vehicle lateral acceleration monitored by said monitor means has passed the zero point.

10. The apparatus for estimating the vehicle side slip angle of claim 2, wherein said tire load determination means compares an absolute value of the yaw rate monitored by said monitor means with a predetermined value, and wherein said changing means switches the estimation of the vehicle side slip angle made by said first estimation means to the estimation of the vehicle side slip angle made by said second estimation means when the absolute value of the yaw rate monitored by said monitor means is smaller than the predetermined value.

11. The apparatus for estimating the vehicle side slip angle of claim 2, wherein said tire load determination means determines whether the yaw rate monitored by said monitor means has passed a zero point, and wherein said changing means switches the estimation of the vehicle side slip angle made by said first estimation means to the estimation of the vehicle side slip angle made by said second estimation means when the yaw rate monitored by said monitor means has passed the zero point.

* * * * *